United States Patent

[11] 3,597,655

| [72] | Inventor | Luciano Forte |
| | | Spring Valley, N.Y. |
| [21] | Appl. No. | 5,503 |
| [22] | Filed | Jan. 26, 1970 |
| [45] | Patented | Aug. 3, 1971 |
| [73] | Assignee | Raytheon Company |
| | | Lexington, Mass. |

[54] OVERVOLTAGE PROTECTIVE CIRCUIT FOR CONSTANT VOLTAGE-CURRENT CROSSOVER NETWORK
14 Claims, 5 Drawing Figs.

[52] U.S. Cl. .................................... 317/16,
317/31, 317/33 VR, 323/22 SC, 317/33 SC, 323/22 T, 323/40, 323/9
[51] Int. Cl. .................................... H02h 3/20, G05f 1/40
[50] Field of Search .................................... 317/33 VR, 16, 31, 33; 323/40, 22 SC, 22 T, 9

[56] References Cited
UNITED STATES PATENTS

| 3,303,411 | 2/1967 | Gately | 323/40 X |
| 3,449,634 | 6/1969 | Hung | 317/33 X |
| 3,524,124 | 8/1970 | Perkinson | 317/16 X |

Primary Examiner—J. D. Miller
Assistant Examiner—Harvey Fendelman
Attorneys—Milton D. Bartlett, Herbert W. Arnold and Joseph D. Pannone ABSTRACT: A crowbar circuit for overvoltage protection of loads in which the setting of the overvoltage crowbar trip point is made without activating the crowbar circuit. Normally, the setting is made by adjusting the power supply to the voltage trip level desired and then setting the crowbar sense network until activation occurs. This procedure is considered dangerous for the load during "online" operation of power supplies. The invention permits setting the crowbar actuation on trip level by meter reading without changing the power supply level.

INVENTOR
LUCIANO FORTE
BY Herbert W. Arnold
ATTORNEY 3,597,655

OVERVOLTAGE PROTECTIVE CIRCUIT FOR CONSTANT VOLTAGE-CURRENT CROSSOVER NETWORK

BACKGROUND OF THE INVENTION

This invention relates to an overvoltage protective circuit for use with direct current power supplies, and more particularly to improved circuit means to protect a power supply load from excessive voltage and to prevent damage to the power supply by preventing the output voltage from exceeding a preset value.

The application of the transistor loads and other solid-state devices necessitates automatic protective circuits which are fast acting to protect the transistor loads and related equipment from overvoltage effects. One such protective device is the well-known crowbar circuit in which a short circuit is placed directly across the output terminals of the power supply in response to excessive voltage. Normally, circuits of this type require that the trip level, or voltage at which the crowbar circuit is actuated, be set by raising the power supply voltage to the desired trip level, and adjusting the overvoltage sense network so that it trips or actuates the crowbar circuit at that desired level. Although this type of circuit is used to prevent damage to loads due to excessive voltage, raising the power supply to the trip level for any length of time during the adjustment period could be extremely dangerous to the load with online power supply operation. In this instance, the load which may consist of semiconductor devices or components which are sensitive to overvoltage during the trip level adjustment period, can become seriously damaged or rendered inoperative by the overvoltage. In some cases, regulated power supply components can become damaged by overvoltage during adjustment of the trip level.

Accordingly, it is an object of the invention to provide a novel circuit for protecting a regulated power supply and loads connected thereto from damage due to excessive voltage.

Another object of this invention is to provide an improved protective circuit which avoids one or more of the disadvantages and limitations of prior art arrangements.

A further object of the invention is to protect circuit components by a protective circuit which does not permit application of overvoltage from a power supply to a load circuit at any time during adjustment of the overvoltage trip level of an associated crowbar circuit.

SUMMARY OF THE INVENTION

In accordance with the invention, the foregoing objects and related advantages are attained in an improved circuit for prevention of overvoltage damage to loads that may be incorporated in a typical transistorized regulated power supply. In particular, protection against damage to the power supply or to load circuit components during adjustment of the trip level of a regulated power supply is achieved by providing a constant reference voltage. As shown herein, a constant current source is used to develop a constant reference voltage across resistance means connected in circuit with the constant current source and and in circuit with the output of a voltage-regulated supply. The constant voltage developed across the resistance means is used as the reference voltage, the value of which is independent of the output voltage of the power supply and is monitored by a meter or other indicating device. Adjustment of the value of the resistance means determines the desired voltage trip level. Voltage comparator means is provided which compares the value of the reference voltage with the value of the actual output voltage of the power supply. Whenever the power supply output voltage substantially equals or exceeds the desired adjusted trip voltage, a control signal is developed which is used to actuate a crowbar short circuit connected across the power supply output and immediately terminate the voltage delivered to the load. In this manner, adjustment of the desired trip point for the output voltage at which the crowbar circuit is actuated can be set in conjunction with a monitor or indicating device without the necessity of changing the power supply output voltage.

The invention further contemplates feeding the control signal to an amplifier in the current-regulating circuit which prevents conduction of the series pass transistor for the power supply and prevents delivery of current from the input of the power supply to the crowbar shorting device.

BRIEF DESCRIPTION OF THE DRAWINGS

For a better understanding of the present invention, together with other and further objects thereof, reference is made to the accompanying drawings in which.

DESCRIPTION OF THE PREFERRED EMBODIMENTS

Figure 1:
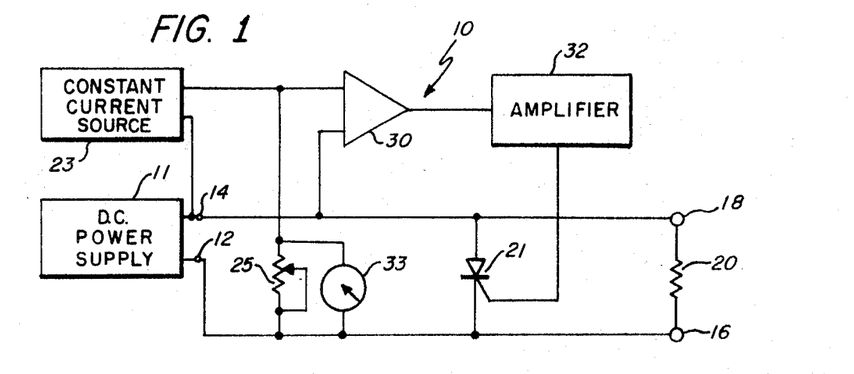
FIG. 1 is a schematic drawing of a direct current power supply employing the protective circuit of the present invention.

Referring now to FIG. 1, there is shown an overvoltage protective circuit 10 having a negative input terminal 12 and a positive input terminal 14 adapted to receive a source of unidirectional voltage, such as shown by a direct current power supply 11. The overvoltage protective circuit 10 is provided with a negative output terminal 16 and a positive output terminal 18 for supplying output voltage to a load, represented as resistor 20. The negative input terminal 12 is connected to the negative output terminal 16.

A short circuit device or crowbar in the form of a silicon-controlled rectifier switch 21 having its anode connected to the negative output terminal 16 and its cathode connected to the positive output terminal 18. The SCR switch 21 can be considered to be a shorting switch whose impedance is controlled by a signal on its gate or trigger electrode.

To permit adjustment of the trip level at which the crowbar 21 conducts without raising the power supply voltage, a constant current source or generator 23 maintains a constant voltage across a series-connected variable resistor 25 independent of the output voltage. The other end of resistor 25 is connected to the negative side of the power supply, and the other terminal of the constant current source 23 is connected to the positive side of the power supply so that the constant current source and reference resistor 25 are in circuit across the power supply. To compare the voltage developed across resistor 25 with the output voltage of the power supply, a well-known voltage comparator 30 has one input lead connected to sense the voltage across reference resistor 25 and its other input lead connected to sense the voltage across the power supply by connecting said lead to the positive output terminal 18. When the power supply voltage at terminal 18 is equal to the voltage developed across reference resistor 25, a control or output signal is fed to a conventional amplifier 32 which provides an amplified control signal which is connected to the control or trigger electrode of the SCR crowbar switch 21 to trip or trigger the switch into conduction and thus short circuit the power supply output terminals 16 and 18. To monitor the voltage developer across resistor 25 a voltage-indicating device or meter is connected across resistor 25.

In operation, the voltage at which crowbar switch 21 trips is preset by monitoring the voltage developed across reference resistor 25 by means of a direct current voltmeter 33 and by adjusting resistor 25 to the desired voltage level. The constant current source 23 maintains a constant voltage across resistor 25 independent of the output voltage, and the voltage across resistor 25 is compared to the power supply output voltage by voltage comparator 30. When the power supply voltage is equal to the voltage across resistor 25, comparator 30 sends a control signal, via amplifier 32, to the SCR switch 21. When the SCR switch 21 receives the signal, it turns on, short circuits the output of the power supply 11, and prevents the voltage from exceeding the value set by resistor 25. In this manner, the protective circuit permits the trip level for the SCR switch 21 to be adjusted without raising the power supply voltage. This is an advantage in that the power supply can be connected to a load, represented as resistor 20, even when the overvoltage circuit is to be adjusted. The protective circuit thereby eliminates the undesirable practice of setting the trip level by raising the power supply output voltage to the desired overvoltage trip level and adjusting the overvoltage circuit so that it will trip at that level.

Figure 2:
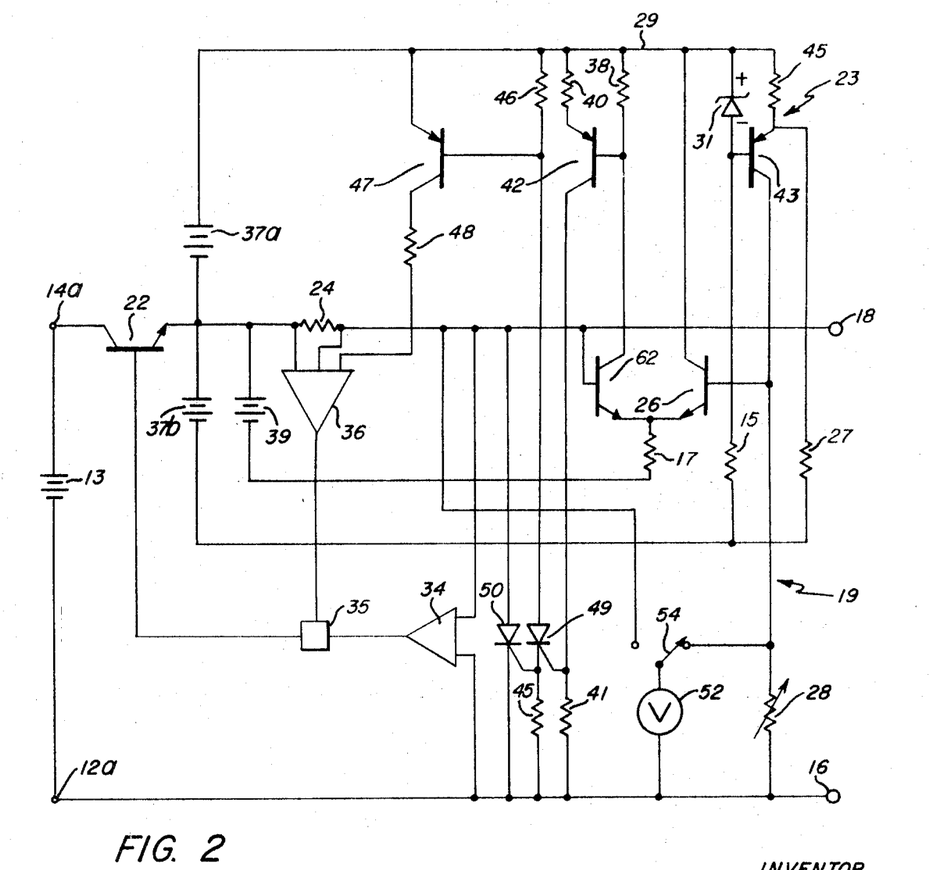
FIG. 2 is a schematic diagram of another embodiment of the invention.

Referring now to FIG. 2 there is shown another embodiment of an overvoltage protective circuit having similar functions as the circuit shown in FIG. 1 with the additional function of utilizing the control voltage from the voltage comparator to actuate a current overload circuit to prevent delivery of current from the direct current source to the short circuit device. In this circuit a source of unregulated unidirectional voltage 13 is connected to a positive input terminal 14a and negative input terminal 12a which constitute input terminals for the voltage- and current-regulating circuit. A series transistor, or pass transistor 22, as it is sometimes called, has its collector connected to the positive input terminal 14a and its emitter connected through a series current-sensing resistor 24 to positive output terminal 18. A load, not shown, is normally connected to terminals 16 and 18. The series transistor 22 may be considered a variable impedance whose impedance is controlled by a signal on its base electrode.

Means are provided to sample the amplitude of the output voltage between terminals 16 and 18 and to feed the sampled voltage back degeneratively to the base of transistor 22 to vary its impedance with the amplitude of the output voltage. Means are also provided to actuate a crowbar circuit to short circuit the output terminals 16 and 18 in response to overvoltage. To this end, a reference voltage circuit 19 is connected between output terminal 16 and output terminal 18 by way of a fixed voltage applied across lead 29 and terminal 18. Thus, for sensing overvoltage, a comparison of the reference voltage developed across resistance 28 and the output voltage is made by a voltage mode differential amplifier in order to control both the output crowbar circuit and the output current of the supply in conjunction with the series pass transistor. For sensing in the current mode, current monitoring or sensing resistor 24 is incorporated in the circuit in series with the input and output terminals of the supply for providing a control signal proportional to the load current. This control signal is fed to the input of the current mode differential amplifier 36 and the output of this differential amplifier is coupled to the control electrode of the series pass transistor. For sensing in the voltage mode, differential amplifier 34 is connected across terminals 16 and 18 and feeds a control signal to the series pass transistor. This combination of differential amplifiers in both the voltage mode and current mode constitutes the basis of a constant voltage and constant current voltage power supply with automatic crossover. One particular control circuit for generating a control signal in the voltage and current modes and for crossing over from one mode to the other when preset values of voltage and current are exceeded is set forth in detail in U.S. Pat. No. 3,305,764 of Paul G. Todd. The control circuit shown in the patent is similar to control circuits used in present power supplies.

Referring again to FIG. 2, a sample of reference voltage is sensed by transistor 26, the base input of which is connected to the junction of variable resistor 28 and constant current source 23, which current through variable resistance 28 provides a preset voltage to the base of transistor 26.

Constant current source 23 is composed of a Zener diode 31, the cathode of which is connected to the bias supply lead 29 and to a bias supply comprising a source of unregulated voltage 37a, the negative side of which is connected to series pass transistor 22. The anode of Zener diode 31 is connected to a source of negative bias voltage 37b by way of well-known current limiting resistor 15. The opposite side of bias voltage source 37b is also connected to series pass transistor 22. Constant current source or generator 23 also includes a transistor amplifier 43, the emitter of which is connected to fixed emitter resistor 45, and also connected to bias supply 37b by way of resistor 27 which compensates for changes of voltages of bias supply 37a and 37b. The base of transistor 43 is connected to the junction of resistor 15 and Zener diode 31. In constant current generator 23, the Zener diode 31, by providing a constant voltage source at the base of transistor 43, fixes the current through current resistor 45 so that the collector current of transistor amplifier 43 is a function of the current through resistor 45 and independent of the collector voltage. For small changes of bias supply voltage from sources 37a and 37b, current through compensating resistor 27 increases in the same proportion as current through resistor 45, thereby tending to maintain the emitter current of transistor 43 constant for changes in bias supply voltage. In this manner, the collector of transistor 43 provides a constant current source for reference with respect to variable resistor 28. This constant current output at the collector of transistor 43 flows through variable resistor 28 and provides a preset trip level or reference voltage, independent of the output voltage. This trip level voltage is sensed by the base input of transistor amplifier 26.

The emitters of transistors 26 and 62 are connected by a common emitter resistor 17 to the source of negative voltage 39 and the transistors 26 and 62 are connected to each other in a differential amplifier circuit. The collector of transistor 26 is connected directly to lead 29 which is a source of positive bias voltage. The collector of transistor 62 is connected through load resistor 38 to lead 29. The base of transistor 62 is connected to positive output terminal 18. The source of negative bias voltage 39 is shown separate from the bias source 37b, although its positive side is connected to the input side of sensing resistor 24. Both negative sources of bias 37b and 39 can be combined, if convenient. The output from comparator transistors 26 and 62 which appears as an overvoltage control signal on the collector of transistor 62 is applied to the base of a conventional transistor amplifier 42, the emitter of which is connected by way of emitter resistor 40 to a source of positive voltage at lead 29. The collector of transistor 42 is connected by way of load resistor 41 to the negative terminal 16. The amplified control signal emerging from the collector of transistor 42 is applied to the trigger electrode of a silicon-controlled rectifier 49 which together with resistor 45 and resistor 46 form a voltage divider circuit which applies a trigger voltage to the input or trigger electrode of crowbar silicon control rectifier 50 to short terminals 16 and 18. The reason for the additional SCR 49 is to provide an additional amplifier circuit for accepting the control signal an providing a continuous overvoltage signal at the base of transistor 47 to maintain a cutoff signal applied to series pass transistor 36 after the overvoltage condition has been terminated by crowbar 50.

Also operating in the voltage control mode is a well-known voltage differential amplifier 34 which in response to sensing of the output voltage across terminals 16 and 18 feeds a voltage mode control signal by way of a voltage divider potentiometer, not shown, to the base of passing transistor 22 by way of a channeling device 35 which operates as a current mode-voltage mode selection device. This selection device can be, for example, a well-known exclusive "OR" circuit adapted to accept one but not the other of the voltage or current mode control signals. In like manner, a well-known current mode amplifier 36 senses the voltage drop across sensing resistance 24, the output of which is the current mode control signal applied to the channeling or switching device 35.

For cutting off the series pass transistor 22 when an overvoltage control signal is applied to trigger crowbar silicon control rectifier 50, there is shown a transistor amplifier 47 which conducts in response to a positive bias signal applied to its base. This occurs when SCR 49 conducts in response to an overvoltage control signal on its control electrode from comparator transistor 62 by way of transistor amplifier 42. When transistor 47 conducts it applies a positive bias voltage by way of isolation resistor 48 to the final stage of current mode amplifier 36 in a well-known manner so that a signal is applied directly to channeling device 35 to cut off series pass transistor 22 and prevent the application of current from source 13 to the shorted crowbar SCR 50 and to a load, now shown, which can be connected to terminals 16 and 18. In this manner, an overvoltage actuates both the crowbar protective circuit and the current mode control circuit to remove the application of current to a load.

In operation, the application of a heavy load across terminals 16 and 18 changes the input to channeling device 35 in a well-known manner and initiates crossover from the voltage to the current mode. This occurs when the voltage at the input to voltage mode amplifier 34 can no longer correct the output voltage to effect a balance at the desired output value in the voltage mode.

In accordance with the invention, the crowbar circuit including SCR 50 is adjusted by setting the voltage across variable resistance 28 to the desired overvoltage trip level. To do this, direct current voltmeter 52 is switched by actuating switch 54 from reading the output voltage, to indicate the voltage developed across variable resistance 28. The voltage indicated across variable resistance 28 is independent of the output voltage due to constant current source 23 developing a voltage across resistance 28 independent of the output voltage across terminals 16 and 18. The trip level thus set by voltmeter 52 then becomes a constant reference voltage which is sensed by differential amplifier transistor 26. The voltage produced across variable resistor 28 acts as reference. If the output voltage raises to equal or above this preset voltage level the voltage at the base of transistor 62 becomes more positive with respect to its emitter and more positive than the base of transistor 26, in effect providing forward bias on transistor 62 and reverse bias on transistor 26. It should be understood that normally in the voltage mode, the base-to-base voltage on differential amplifier transistors 26 and 62 is such that the base of transistor 26 is more positive than the base of transistor 62, thereby providing reverse bias of transistor 62 and a forward bias or transistor 26. Up to this latter point, however, a control signal is provided at the emitter of transistor 62, and fed by way of amplifier transistor 42 to the trigger electrode of silicon control rectifier 49. Conduction of silicon control rectifier 49 initiates the conduction crowbar SCR 50 to short power supply terminals 16 and 18 and disable the input to voltage-sensing amplifier. This conduction also maintains, by voltage divider action of resistors 45 and 46, a constant bias voltage at the base of transistor 47 even after disabling of the power supply output voltage. This bias is applied to the base of transistor 47 to initiate conduction therein and feed a control voltage at a stage, not shown, in differential comparator amplifier 36 in a well-known manner to cut off the output from amplifier 36 and remove a signal output from channeling device 35 which opens series pass transistor 22 so that current from source 13 is no longer applied to load terminals 16 and 18. In this manner, the invention protects the load applied to terminals 16 and 18 from overvoltage, even during adjustment of the trip level for the crowbar circuit, and further provides that series pass transistor 22 is deactivated by the control signal which actuates the crowbar circuit, thus providing improved protection for components in the regulated power supply.

Figure 3A:
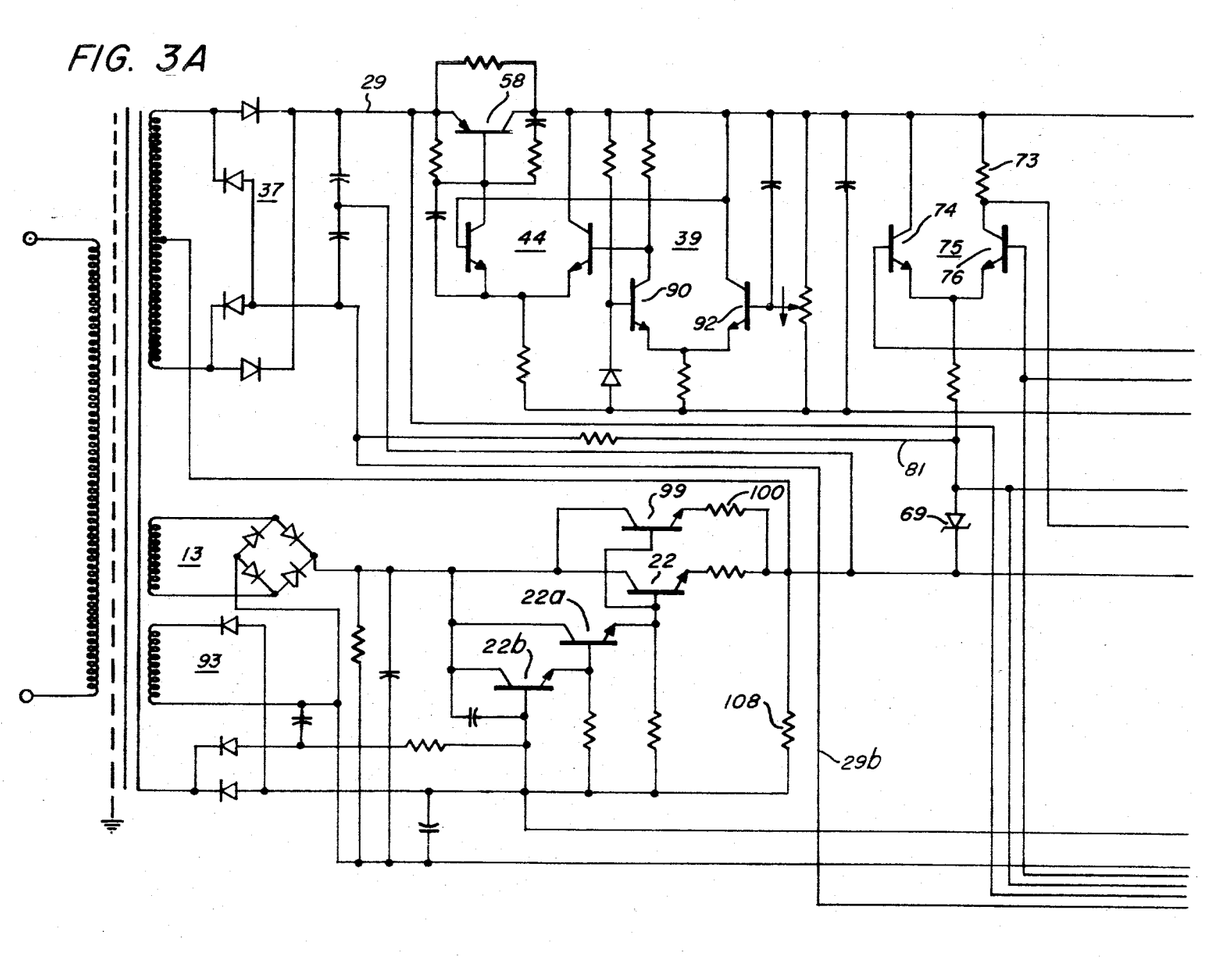
FIGS. 3A, 3B and 3C form a complete schematic circuit in accordance with the form of the invention shown in FIG. 2 but with added details.
Figure 3B:
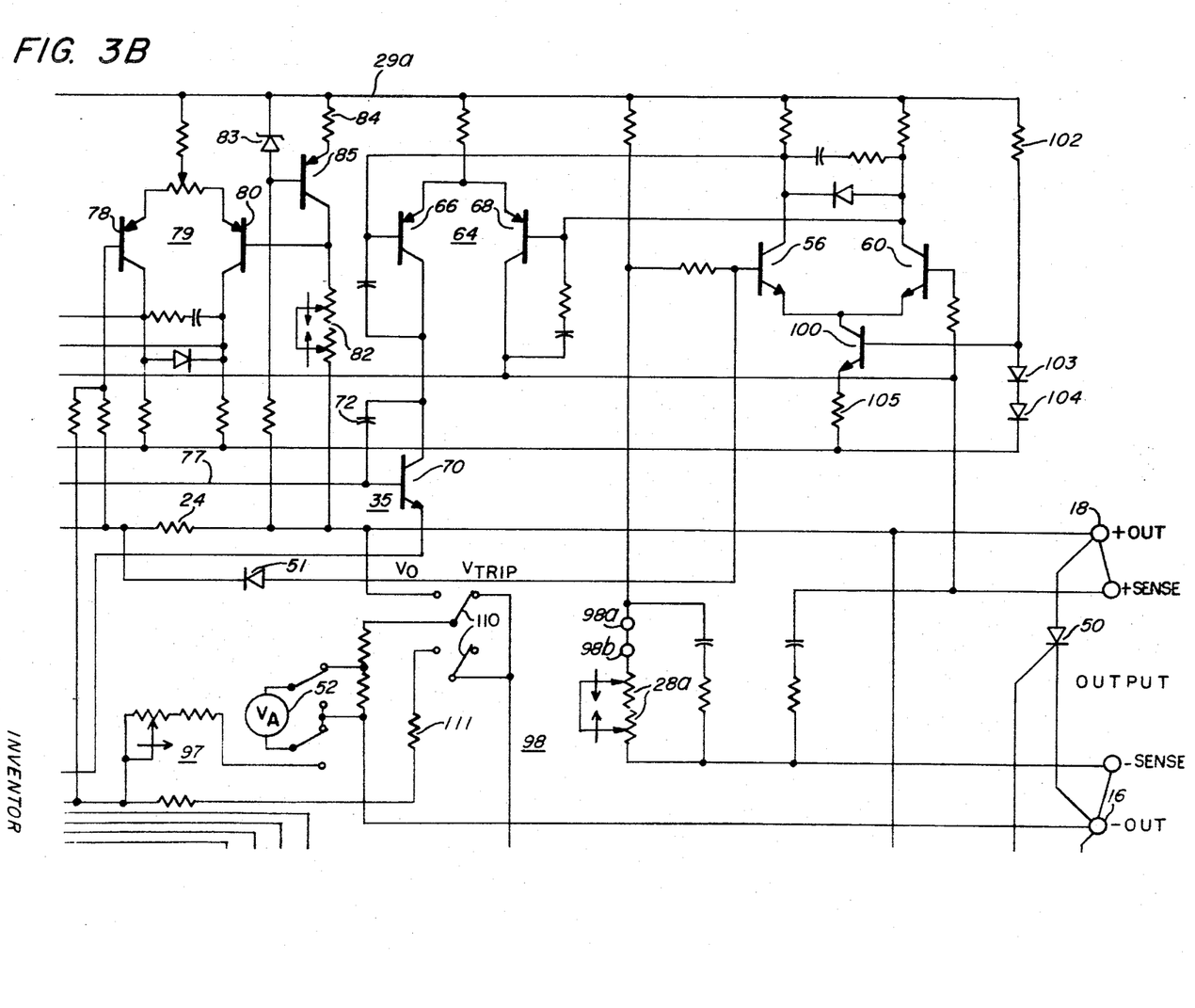
Figure 3C:
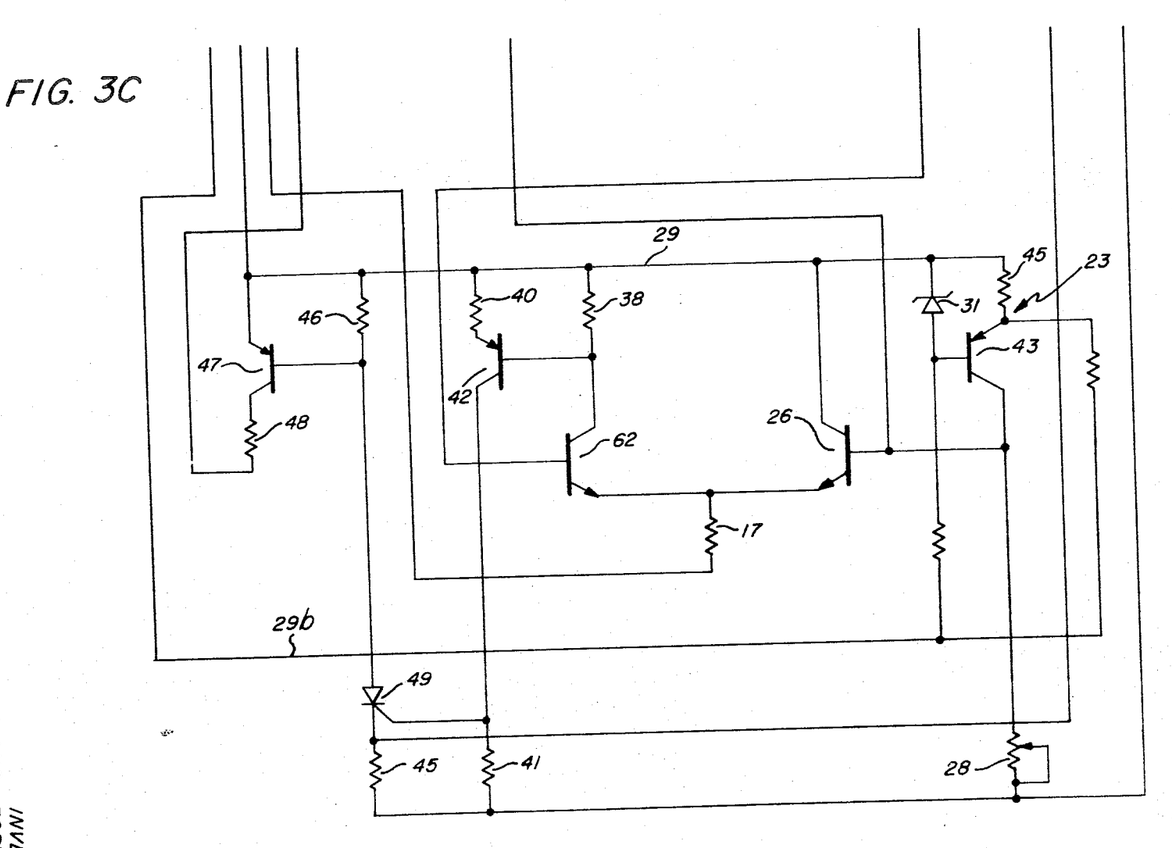

FIGS. 3A, 3B and 3C taken together make up a complete detailed circuit of a power supply having the form of FIG. 2. In this figure the corresponding parts in FIGS. 2 and 3 bear the same numbers. Since the operation of the FIGS. 3A, 3B and 3C will thus be clear from the above description of FIG. 2, only the additional means for amplifying the output of the differential amplifiers, the channel circuit means, and the amplifiers for the series transistors here shown in a more detailed manner will be described. In particular, unregulated voltage source 13 of FIG. 3A is connected to series pass transistor 22 and to output terminals 16 and 18 of FIG. 3B. Transistor 22 is fed from a conventional Darlington amplifier including serially connected transistors 22a and 22b in order to amplify the control signal in the voltage mode from differential amplifier transistors 56 and 60. This control signal is applied to transistors 22a and 22b by way of an additional voltage mode amplifier 64, transistors 66 and 68 and channeling or selection device 35 which includes transistor 70 and stabilization capacitor 72. This capacitor provides the necessary feedback for stabilization in the current mode. In this mode, transistor 70 acts in a linear mode, as a variable impedance to control the current flowing from its emitter. It should be noted that in the voltage mode, transistor 76 of the current mode differential amplifier 75 is in a cutoff condition, causing a large positive voltage from 29 to be impressed on the base of transistor 70 through resistor 73, thus driving transistor 70 into a saturated condition and therefore permitting no hindrance to current flow from voltage mode amplifier 64. Transistors 74 and 76 amplify the current mode signal developed from the current mode differential amplifier 79. The voltage drop across sensing resistor 24 in conjunction with a reference voltage developed across variable resistor 82 is applied to transistors 78 and 80 to provide an unbalance of the current mode differential amplifier 79 in which voltage output developed at the collector of transistors 78 and 80, respectively, rises and falls. This differential output is connected respectively to the base inputs of transistors 74 and 76 in amplifier 75. The output of transistor 76 developed at its collector is applied by way of lead 77 to channeling device 35 to take over control of the series pass transistor 22 and initiate control of the current mode in response to heavy load current. In the current mode, diode 51 is selected to conduct prior to an undesirable buildup of voltage at the base of transistor 56 and the resulting unwanted current is shunted away to the input side of sense resistor 24. Also shown in FIG. 3 is a source of unregulated voltage 37 which supplies the necessary power for the well known reference power supply whose output appears between lead 29a and terminal 18. Source 37 also supplies the necessary voltage for developing a bias voltage across Zener diode 69. The reference power supply output is controlled by pass transistor 58 in response to control signals from the sensing network 39 and conventional driver amplifier 44. Transistors 90 and 92 have been added to amplify the sensing signal and transmit it to amplifier 44.

Additionally, regulated bias power source 69 provides bias potentials for the voltage and current mode amplifiers and the series pass transistors. Zener reference diode 69 supplies a negative regulated voltage source for the voltage and current mode control amplifiers. Also, a conventional meter circuit 97 with switching means for using the same voltmeter 52 to set the level of trip voltage is shown. In addition, programming input circuit 98 is shown for introducing, when desired, rapid program control of the power supply and does not form a part of the present invention. The programming resistance or signal is injected at terminals 98a and 98b and the output voltage is adjusted by variable potentiometer 28a.

The terminals +Sense and −Sense are for the purpose of externally sensing output voltages from terminals 16 and 18 at remote equipment locations, in which case the connections shown are omitted and connected at the desired remote location. Across output terminals 16 and 18 is crowbar SCR device 50 connected to short circuit and power supply terminals in response to a trigger or control signal applied to its input electrode.

The unregulated voltage source 93 is used to supply negative bias voltages for the passing transistors, the associated Darlington driver amplifiers 22a and 22b, as well as minimum load resistor 108. Series transistor 22 is connected in parallel in a known manner with transistor 99 and resistor 100 for increased power-handling ability.

The network comprising resistor 102, diodes 103 and 104, resistor 105 and transistor 106 forms a well-known current device, of a type similar to that used in the associated overvoltage protective circuit, whereby the total emitter current of the differential amplifier transistors 56 and 60 is held constant. In like manner, Zener diode 83 in conjunction with resistor 84 and transistor 85 provides a constant current source for developing a reference voltage across resistor 82.

From the above description and drawings it will be evident that the overvoltage protective circuit of FIG. 3C can be used in connection with the constant current-constant voltage power supply without interfering with its normal operation. In particular, as shown in the protective circuit of the invention of FIG. 3C, comparator transistors 26 and 62, amplifier transistors 42 and 47, and constant current generator transistor 43 are fed from bias voltage source 37 of FIG. 3A by way of lead 29. The negative bias voltage for constant current source 23 is applied by way of lead 29b from separate rectifiers providing a negative bias in source 37. The bias voltage for comparator transistors 26 and 62 is also fed by way of resistor 17 from these rectifiers by way of a dropping resistor in line 81. The trigger voltage developed across resistor 45 is fed to the input of crowbar SCR 50 when silicon control rectifier switch 49 conducts as previously described in detail with respect to FIG. 2. In accordance with the invention, the trip voltage level is adjusted by variable resistor 28 after voltmeter 52 has been connected across resistor 28 by means of meter switch 110, which is set as shown, to the trip position from the position of reading output voltage across output terminals 16 and 18. Resistor 111 operates as a dummy meter load in the trip-adjusting circuit to compensate for the meter load when the meter 52 is switched to read output voltage $V_o$. Thus, when the trip level has been set, independently of the output voltage and a load connected thereto, meter 52 can be set to read the output voltage without disturbing the setting of the voltage trip level. When an overvoltage is sensed by comparator transistor 26 and 62, crowbar 50 is actuated. Current cutoff amplifier transistor 47, as previously described, conducts to provide a control signal by way of its collector and resistor 48 to the base of transistor 76 in current differential amplifier 75 to unbalance amplifier 75. This, in turn, transmits a control signal to channeling circuit 35 which provides an output to cutoff series pass transistors 22 and 99, thus removing the voltage source 13 from the crowbar short circuit at terminals 16 and 18 and providing added protection for power supply components. Normal operation of the voltage regulating circuit is not interrupted by adjustment of the protective circuit which operates only after a buildup of output voltage has occurred.

The foregoing disclosure and drawings are merely illustrative of the principles of the invention and are not to be interpreted in a limiting sense. The only limitations will be determined from the scope of the appended claims.

What I claim is:

1. An overvoltage protective circuit for a direct current power supply comprising a direct current power source having a pair of output terminals, a constant current source, voltage comparator means, variable resistance means connected in series with one output terminal of said power source and an input terminal of said voltage comparator means, the other input terminal of said comparator means connected to the other output terminal of said power source, said constant current source connected to provide a constant voltage drop across said resistance means independent of the output voltage of said power source, short circuit means connected across the output terminals of said power source and adapted to actuate in response to an overvoltage signal, means for monitoring the voltage developed across said resistance means, means for adjusting said resistance means to a predetermined value as determined by said monitoring means, said comparator means adapted to provide an overvoltage signal when the voltage of said direct current power source equals said predetermined value, and means for connecting said overvoltage signal to actuate said short circuit means.

2. An overvoltage protective circuit for a direct current power supply comprising a pair of input terminals for connection to a source of direct current, a pair of load terminals for connecting a load to be supplied with regulated voltage, a voltage regulator device connected in series between an input terminal and one load terminal, a voltage-sensing circuit adapted to change the resistance of said regulator device in response to changes in output voltage at said load terminals, constant current means and resistance means connected in circuit with said load terminals to provide a reference voltage across said resistance means independent of voltage across said load terminals, voltage comparator means fed by said reference voltage and said output voltage at said load terminals, said comparator means adapted to provide a control signal when said output voltage equals said reference voltage, short circuit means connected across said load terminals and adapted to actuate in response to said control signal to short circuit the output voltage at said load terminals, means to increase the resistance of said regulator device to prevent the flow of current from said direct current supply to said load terminals in response to said control signal, and means for adjusting said reference voltage to set the overvoltage actuation level independent of adjustment of said output voltage.

3. A protective circuit for preventing the output voltage of a direct current power supply from exceeding a preset value comprising a pair of input terminals for connection to a direct current power supply, a constant current source, resistance means connected in series with said constant current source and said input terminals to produce a reference voltage across said resistance means independently of the output voltage of said power supply, means for setting said reference voltage to a predetermined value monitored by a visual indicating device, means for comparing said value of said reference voltage with the output voltage of said power supply, said comparator means providing a control signal when said output voltage becomes equal to said reference voltage, and short circuit means connected across the output of said power supply and adapted to actuate in response to said control signal.

4. A protective circuit for a direct current power supply as set forth in claim 3 in which the short circuit means includes a silicon control rectifier.

5. A protective circuit for preventing the output voltage of a direct current power supply from exceeding a preset value comprising a pair of input terminals for connection to a direct current power supply, a constant current source, resistance means connected in circuit with said constant current source and said input terminals to produce a reference voltage across said resistance means independently of the output voltage of said power supply, means for monitoring said reference voltage, means for comparing said reference voltage with the output voltage of said power supply, said comparator means providing a control signal when said output voltage equals said reference voltage, short circuit means connected across the output of said power supply and adapted to actuate in response to said control signal, and means for adjusting the value of said reference voltage to provide a desired actuation level for said short circuit means as provided by said monitoring means.

6. An overvoltage protective circuit for use with a direct current power supply comprising constant current means and resistance means connected in circuit with the output of said power supply to provide a predetermined reference voltage across said resistance means, means for monitoring and selecting the value of said reference voltage independently of the output of said power supply, comparator means for comparing said selected voltage with the output voltage of said power supply, said comparator means adapted to provide an overvoltage signal when the output voltage equals the value of said selected voltage, and a crowbar circuit for disabling the output voltage of said power supply in response to said overvoltage signal.

7. An overvoltage protective circuit as set forth in claim 1 which includes means to actuate a current overload device in the output circuit of said power supply to prevent delivery of power supply current to said short circuit means in response to said overvoltage signal.

8. A regulated power supply comprising a regulating device connected between the input and output circuits of the power supply, a sensing amplifier circuit operative to produce voltage error signals representative of variations in output potential, means for coupling said voltage error signals to vary the impedance of said regulating device, a series sense impedance connected in series with the input and output circuits of said power supply, an overvoltage protective circuit including resistance means, means for producing a predetermined reference voltage across said resistance means independently of the output voltage of said power supply, means for monitoring said reference voltage, means for comparing the value of said reference voltage with the output voltage of said power supply, said comparator means adapted to provide a control signal when the output voltage equals the value of said reference voltage, a crowbar circuit connected across the output of said power supply for disabling the output voltage in response to said control signal, channeling amplifier means responsive to the output of said comparator means and to current error signals representative of variations in current through said series sense impedance to vary the conductivity of said regulating device, and means for adjusting the value of said reference voltage to provide a desired actuation level for said crowbar circuit independent of any output voltage variation as provided by said monitoring means without requiring a change in output voltage level.

9. A voltage protective circuit for a power supply comprising a pair of input and output terminals, a source of direct current connected to said input terminals, a voltage-current regulator circuit which includes series-regulating means connected between an input and output terminal of said power supply, a current-sensing resistance, a voltage-sensing circuit coupled to a load circuit and said output terminals, a differential amplifier coupled from the voltage-sensing circuit to an input of said series-regulating means, said current-sensing resistance connected in series between an input terminal and an output terminal of said power supply, said current-sensing resistance providing an overvoltage control signal in response to current flow through said sensing resistance, means for coupling the control signal from said sensing resistance to said series-regulating means, a crowbar shorting device connected across said load circuit and adapted to conduct and short circuit said load circuit in response to a trigger signal, a source of reference voltage adapted to set the trip level of said crowbar device independently of the output voltage produced across said load circuit, means for monitoring said reference voltage, means for providing a trigger signal when said output voltage equals said reference voltage, means for applying said trigger signal to said crowbar shorting device, means for adjusting said reference voltage to a predetermined level of actuation for said trigger signal as provided by said monitoring means, and means in response to said trigger signal connected to prevent conduction of said series-regulating means, thereby disabling the flow of current from said source to said crowbar device.

10. A voltage protective circuit for preventing the output voltage from exceeding a preset trip level in a direct current power supply which includes series-regulating means connected between the input and output of said power supply comprising means for providing a constant current source, resistance means connected in circuit with said constant current source and the input of said power supply to produce a reference voltage across said resistance means independently of the output voltage of said power supply, means for monitoring and selecting said reference voltage to a desired overvoltage trip level in excess of the present output level, said overvoltage trip level being monitored by an indicating device, means for comparing said adjusted reference voltage with said output voltage of said power supply to provide a control signal when said output voltage equals said reference voltage, crowbar short circuit means connected across the output of said power supply adapted to actuate at said trip level in response to said control signal, and means in response to said control signal to bias said series-regulating means to prevent delivery of current from the input of said power supply to said crowbar short circuit means.

11. A voltage protective circuit as set forth in claim 10 wherein said power-supply-regulating means is connected to prevent the application of current to said crowbar short circuit means after actuation of said crowbar circuit means.

12. A voltage protective circuit as set forth in claim 10 in which the adjustment of said reference voltage is monitored by a visual indicating device to provide the desired trip level.

13. The method of preventing the output voltage of a direct current power supply from exceeding a preset value which comprises the steps of providing a constant source of reference voltage for adjusting the trip level independent of adjustment of the output voltage of said power supply, providing an indicating device for monitoring said reference voltage independent of changes in the output voltage, adjusting the reference voltage to a desired trip level as monitored by said indicating device without changing the value of said output voltage, comparing the output voltage with the adjusted reference voltage to provide a control signal whenever the reference voltage at the adjusted trip level and the output voltage become equal, utilizing the control signal to actuate a crowbar short circuit device connected across the output of the power supply for the purpose of disabling the output voltage at the adjusted trip level, and further providing additional comparator means for opening a series-regulating means to remove the input voltage of said power supply from said crowbar short circuit device in response to said control signal.

14. A voltage protective circuit for a power supply comprising a pair of input and output terminals, a source of direct current connected to said input terminals, a voltage current regulator circuit which includes series-regulating means connected between an input and output terminal of said power supply, a current-sensing resistance, a voltage-sensing circuit coupled to a load circuit and said output terminals, an amplifier coupled from the voltage-sensing resistance providing an overvoltage control signal in response to current flow through said sensing resistance, means for coupling the control signal from said sensing resistance to said series-regulating means, a crowbar shorting device connected across said load circuit and adapted to conduct and short circuit said load circuit in response to a trigger signal, a source of reference voltage for setting the trip level of said crowbar device provided independently of the output voltage produced across said load circuit, means for monitoring said reference voltage, means for providing a trigger signal when said output voltage equals said reference voltage, means for applying said trigger signal to said crowbar shorting device, means for adjusting said reference voltage to a desired level of actuation by said trigger signal as provided by said monitoring means, and bias means in response to said trigger signal connected to prevent conduction of said series-regulating means, thereby disabling the flow of current from said source to said crowbar device.

UNITED STATES PATENT OFFICE
CERTIFICATE OF CORRECTION

Patent No. 3,597,655     Dated August 3, 1971

Inventor(s) Luciano Forte

It is certified that error appears in the above-identified patent and that said Letters Patent are hereby corrected as shown below:

Column 2, line 65, change "developer" to -- developed --

Column 4, line 53, change "an" to -- and --

Column 6, line 16, after "from" insert -- lead --

Column 10, line 46, after "voltage-sensing" insert -- circuit to an input of said series regulating means, said current sensing resistance connected in series between an input terminal and an output terminal of said power supply, said current sensing --

Signed and sealed this 21st day of March 1972.

(SEAL)
Attest:

EDWARD M. FLETCHER, JR.
Attesting Officer

ROBERT GOTTSCHALK
Commissioner of Patents